United States Patent
Aono et al.

(10) Patent No.: US 11,415,187 B2
(45) Date of Patent: Aug. 16, 2022

(54) CENTRIFUGAL CLUTCH

(71) Applicant: Kabushiki Kaisha F.C.C., Hamamatsu (JP)

(72) Inventors: Kaoru Aono, Shizuoka (JP); Yuta Yokomichi, Shizuoka (JP); Yuta Kine, Shizuoka (JP); Makoto Kataoka, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 17/047,979

(22) PCT Filed: May 14, 2019

(86) PCT No.: PCT/JP2019/019164
§ 371 (c)(1),
(2) Date: Oct. 15, 2020

(87) PCT Pub. No.: WO2019/221138
PCT Pub. Date: Nov. 21, 2019

(65) Prior Publication Data
US 2021/0115986 A1  Apr. 22, 2021

(30) Foreign Application Priority Data
May 18, 2018 (JP) .............................. JP2018-096321

(51) Int. Cl.
*F16D 43/18* (2006.01)
*F16D 43/14* (2006.01)

(52) U.S. Cl.
CPC ........ *F16D 43/18* (2013.01); *F16D 2043/145* (2013.01)

(58) Field of Classification Search
CPC ........................... F16D 43/18; F16D 2043/145
See application file for complete search history.

(56) References Cited

U.S. PATENT DOCUMENTS 2,087,968 A * 7/1937 Dodge .................... F16D 13/18
192/105 R
2,375,909 A * 5/1945 Fawick ................... F16D 43/18
192/105 BA
(Continued)

FOREIGN PATENT DOCUMENTS

EP 0714801 A2 6/1996
JP 2014-145420 A 8/2014
(Continued)

OTHER PUBLICATIONS

International Search Report (ISR) dated Jul. 16, 2019 filed in PCT/JP2019/019164.
(Continued)

*Primary Examiner* — David R Morris
(74) *Attorney, Agent, or Firm* — Rankin, Hill & Clark LLP

(57) ABSTRACT

Provided is a centrifugal clutch configured so that a clutch weight can be smoothly displaced without interference with backward displacement of the clutch weight in a rotary drive direction of a drive plate and assist thrust can be stably generated. A centrifugal clutch 200 includes, through swing support pins 214, clutch weights 230 on a drive plate 210 to be rotatably driven by drive force of an engine, and includes plate-side cam bodies 218 and dampers 221. The clutch weight 230 turnably displaces to a clutch outer 240 side through the swing support pin 214, and includes a weight-side cam body 235 configured to climb on the plate-side cam body 218 and a damper groove 236. The damper groove 236 is formed such that a groove width W2 for fitting the damper 221 when the clutch weight 230 is at a clutch-ON position is wider to a front side in a rotary drive direction of the drive plate 210 than a groove width W1 for fitting the damper 221 when the clutch weight 230 is at a clutch-OFF position.

12 Claims, 8 Drawing Sheets

(56) References Cited

U.S. PATENT DOCUMENTS

| | | | |
|---|---|---|---|
| 7,234,581 B2* | 6/2007 | Tsuchiya | F16D 43/18 192/105 CD |
| 7,600,625 B2* | 10/2009 | Ishikawa | F16D 43/18 192/105 CD |
| 10,539,197 B2* | 1/2020 | Aono | F16D 43/18 |
| 10,626,932 B2* | 4/2020 | Yokomichi | F16D 43/22 |
| 10,927,905 B2* | 2/2021 | Aono | F16D 43/18 |
| 11,060,569 B2* | 7/2021 | Yokomichi | F16D 43/18 |
| 2005/0178637 A1* | 8/2005 | Tsuchiya | F16D 43/18 192/105 CD |
| 2007/0095629 A1* | 5/2007 | Ishikawa | F16D 43/18 192/105 CD |
| 2019/0072140 A1* | 3/2019 | Aono | F16D 43/18 |
| 2019/0186558 A1 | 6/2019 | Yokomichi et al. | |
| 2019/0234470 A1* | 8/2019 | Yokomichi | F16D 43/18 |
| 2019/0338813 A1 | 11/2019 | Aono et al. | |
| 2020/0340540 A1* | 10/2020 | Aono | F16D 43/18 |
| 2020/0370607 A1* | 11/2020 | Aono | F16D 43/18 |
| 2021/0079961 A1* | 3/2021 | Aono | F16D 43/18 |
| 2021/0108687 A1* | 4/2021 | Aono | F16D 43/211 |

FOREIGN PATENT DOCUMENTS

| | | | | |
|---|---|---|---|---|
| JP | 2014-163492 A | | 9/2014 | |
| JP | 2015-203429 A | | 11/2015 | |
| JP | 2017072211 A | * | 4/2017 | F16D 43/18 |
| JP | 2018-9675 A | | 1/2018 | |
| JP | 2018-76874 A | | 5/2018 | |
| WO | 2007/010686 A1 | | 1/2007 | |

OTHER PUBLICATIONS

Extended European Search Report (EESR) dated Dec. 20, 2021 for corresponding European Patent Application No. 19802644.5.

* cited by examiner

CENTRIFUGAL CLUTCH

TECHNICAL FIELD

The present invention relates to a centrifugal clutch configured to block transmission of rotary drive force to a driven side until an engine reaches a predetermined number of rotations and transmit the rotary drive force to the driven side when the engine reaches the predetermined number of rotations.

BACKGROUND ART

Typically, in, e.g., a motorcycle or a string trimmer, a centrifugal clutch configured to transmit rotary drive force to a driven side when an engine reaches a predetermined number of rotations has been used. For example, a centrifugal clutch disclosed in Patent Literature 1 below includes a drive plate to be rotatably driven by rotary drive force from an engine and a clutch weight. The clutch weight is rotatably supported on the drive plate, and by rotary drive of the drive plate, is opened outwardly in a radial direction and is pressed against a clutch outer. In this case, the centrifugal clutch is configured such that a columnar damper including an elastic body is provided on the drive plate and a damper groove in which the damper is fitted with the damper being sandwiched by the damper groove is formed at the clutch weight, thereby buffering the turning clutch weight.

CITATION LIST

Patent Literature

PATENT LITERATURE 1: JP-A-2018-9675

However, in the centrifugal clutch described in Patent Literature 1 above, there was the following problem. That is, when the clutch weight is pressed against the clutch outer and displaces backward in a rotary drive direction of the drive plate, the damper is strongly pressed against the damper groove. This interferes with action for pressing the clutch outer by the clutch weight. For this reason, assist thrust for pressing the clutch outer by the clutch weight is decreased and becomes unstable.

The present invention has been made for coping with the above-described problem, and an object of the present invention is to provide the following centrifugal clutch. This centrifugal clutch can smoothly displace clutch weights without interference with backward displacement of the clutch weights in a rotary drive direction of a drive plate, and therefore, can stably generate assist thrust.

SUMMARY OF INVENTION

In order to achieve the above-described problem, a feature of the present invention is a centrifugal clutch which includes: a drive plate to be rotatably driven together with a driven pulley in response to drive force of an engine; a clutch outer having, outside the drive plate, a cylindrical surface provided concentrically with the drive plate; a clutch weight having a clutch shoe formed to extend along a circumferential direction of the drive plate and facing the cylindrical surface of the clutch outer, one end side of the clutch weight in the circumferential direction being turnably attached onto the drive plate through a swing support pin and a pin slide hole and the other end side displacing toward a cylindrical surface side of the clutch outer; a plate-side cam body having, on the drive plate, a surface extending in a rotary drive axis direction of the drive plate; and a weight-side cam body provided at the clutch weight and configured to slide and climb on the plate-side cam body upon displacement of the other end side of the clutch weight; a damper provided on the drive plate to face the clutch weight and including an elastic body; and a damper groove formed in a groove shape at the clutch weight, extending along a turning displacement direction in which the clutch weight approaches or separates from the clutch outer, and configured such that the damper is fitted in the damper groove with the damper being slidably sandwiched by the damper groove. The swing support pin is provided at one of the drive plate or the clutch weight, and is formed to extend toward the other one of the drive plate or the clutch weight, the pin slide hole is provided at the other one of the drive plate or the clutch weight and is formed in a long hole shape allowing backward displacement of the one end side of the clutch weight in a rotary drive direction of the drive plate, and the swing support pin is slidably displaceably fitted in the pin slide hole, and the damper groove is formed such that a groove width for fitting the damper when the clutch weight is at a clutch-ON position at which the clutch weight is pressed against the clutch outer expands to a front side in the rotary drive direction of the drive plate as compared to a groove width for fitting the damper when the clutch weight is at a clutch-OFF position at which the clutch weight is separated from the clutch outer.

According to the feature of the present invention configured as described above, in the centrifugal clutch, the groove width for the damper is formed such that the groove width at a portion in which the damper is fitted at a position at which the clutch weight contacts the clutch outer expands to the front side in the rotary drive direction of the drive plate as compared to the groove width at a portion in which the damper is fitted at a position at which the clutch weight is separated from the clutch outer. With this configuration, in the centrifugal clutch according to the present invention, in a case where the clutch weight displaces backward in the rotary drive direction of the drive plate, the clutch weight can be smoothly displaced without interference with displacement of the clutch weight, and assist thrust can be stably generated.

Note that the long hole in the above-described aspect of the invention is a through-hole or a blind hole extending long and thin as a whole, and a length in one direction is longer than that in a width direction perpendicular to the one direction.

Further, another feature of the present invention is the centrifugal clutch in which the damper groove is formed such that the groove width for fitting the damper when the clutch weight is at the clutch-ON position is such a groove width that the damper is elastically deformed with an amount equal to or smaller than an elastic deformation amount of the damper when the clutch weight is at the clutch-OFF position.

According to another feature of the present invention configured as described above, the centrifugal clutch is formed such that the groove width of the damper groove in which the damper is fitted when the clutch weight is at the clutch-ON position is such a groove width that the damper is elastically deformed with the amount equal to or smaller than the elastic deformation amount of the damper at the clutch-OFF position at which the clutch weight is separated from the clutch outer. With this configuration, in the centrifugal clutch according to the present invention, in a case where the clutch weight displaces backward in the rotary drive direction of the drive plate, the clutch weight can be smoothly displaced without interference with displacement of the clutch weight, and the assist thrust can be stably generated.

In this case, in the centrifugal clutch, the groove width of the damper groove in which the damper is fitted when the clutch weight is at the position contacting the clutch outer is formed as such a groove width that the damper is elastically deformed with the same deformation amount as the elastic deformation amount of the damper when the clutch weight is at the position separated from the clutch outer. With this configuration, in the centrifugal clutch according to the present invention, resistance to displacement of the damper can be constant between before and after the clutch weight displaces backward in the rotary drive direction of the drive plate. Thus, the clutch weight can be more smoothly displaced, and the assist thrust can be stably generated.

Further, still another feature of the present invention is that, in the centrifugal clutch, a rear wall formed on a rear side in the rotary drive direction of the drive plate and a front wall formed on the front side in the rotary drive direction of the drive plate include curved surfaces having arcs about different positions in the damper groove, and the rear wall and the front wall forming the damper groove.

According to still another feature of the present invention configured as described above, in the damper groove in the centrifugal clutch, the rear wall formed on the rear side in the rotary drive direction of the drive plate and the front wall formed on the front side in the rotary drive direction of the drive plate include the curved surfaces having the arcs about the different positions. Thus, each of the rear wall and the front wall can include the curved surface with a single curvature, and the damper groove can be easily configured and shaped.

Moreover, still another feature of the present invention is that, in the centrifugal clutch, a length of the front wall forming the damper groove and formed on the front side in the rotary drive direction of the drive plate is longer than a portion contacting the damper in a case where the clutch shoe contacts the clutch outer in a terminal state in which abrasion of the clutch shoe has progressed and the clutch shoe has approached a use limit in the damper groove.

According to still another feature of the present invention configured as described above, in the centrifugal clutch, the length of the front wall on the front side in the rotary drive direction of the drive plate in the damper groove is longer than the portion contacting the damper in a case where the clutch shoe contacts the clutch outer in the terminal state in which abrasion of the clutch shoe has progressed and the clutch shoe has approached the use limit. With this configuration, according to the centrifugal clutch of the present invention, even in a case where abrasion of the clutch shoe has progressed, resistance or damage caused when the damper returns into the damper groove again due to catching of part of the damper by an end portion of the damper groove after detachment from the damper groove or crushing of part of the damper is prevented. Thus, smooth displacement of the damper in the damper groove before and after abrasion of the clutch shoe progresses is ensured.

Further, still another feature of the present invention is that, in the centrifugal clutch, the damper groove is formed such that the rear wall forming the damper groove and formed on the rear side in the rotary drive direction of the drive plate is separated from the damper when the clutch weight displaces backward in the rotary drive direction of the drive plate.

According to still another feature of the present invention configured as described above, the centrifugal clutch is formed such that the rear wall on the rear side in the rotary drive direction of the drive plate in the damper groove is separated from the damper when the clutch weight displaces backward in the rotary drive direction of the drive plate. With this configuration, in the centrifugal clutch, resistance caused due to pressing of the damper against the rear wall when the clutch weight displaces backward in the rotary drive direction of the drive plate can be prevented. Thus, the clutch weight can be more smoothly displaced, and the assist thrust can be stably generated. Moreover, in the centrifugal clutch, even in a case where abrasion of the clutch shoe has progressed, resistance acting on a clutch spring pulling the clutch weight can be suppressed. Thus, the clutch weight can be more smoothly displaced, and the assist thrust can be stably generated.

DESCRIPTION OF EMBODIMENTS

Figure 1:
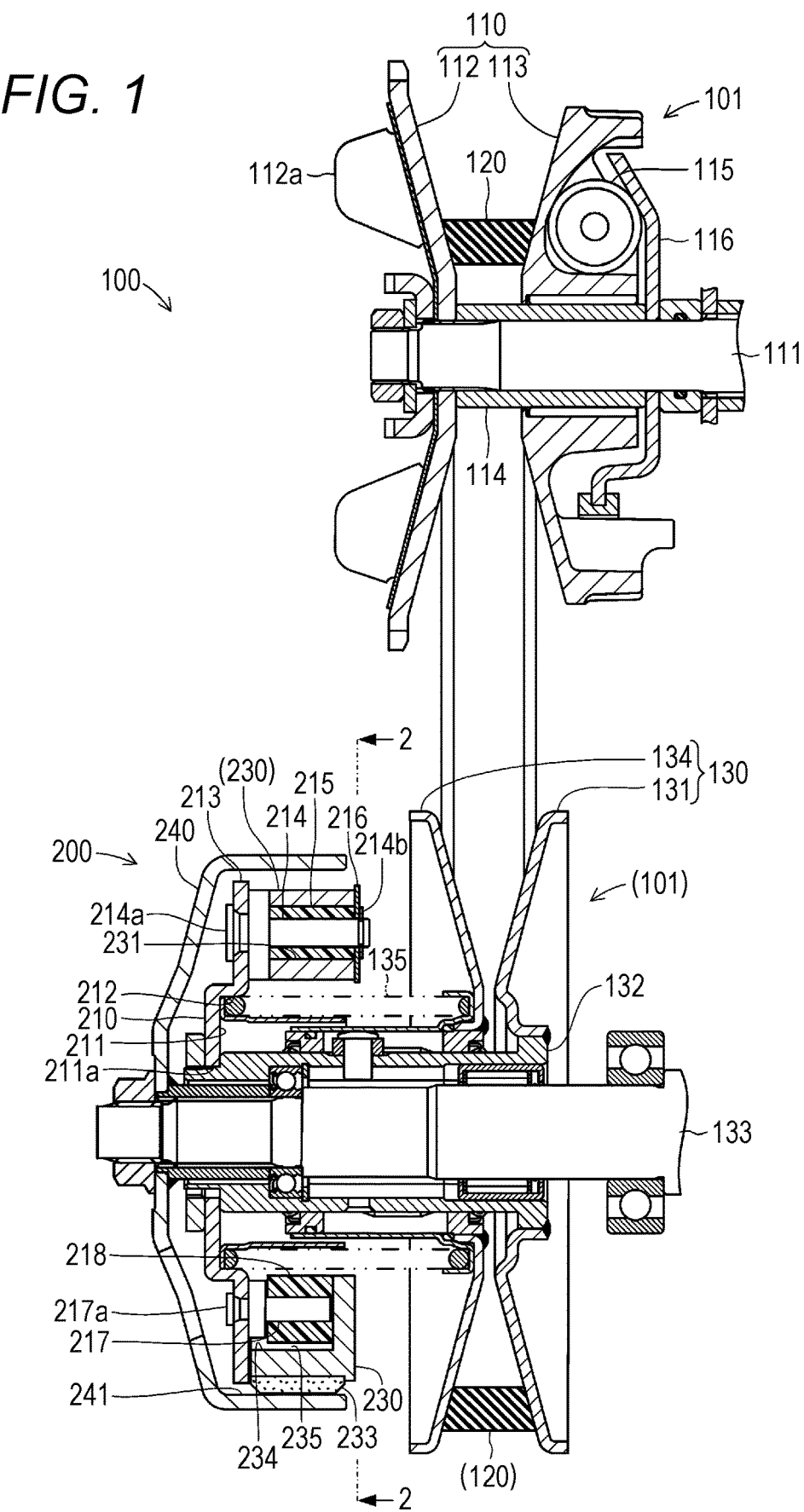
FIG. 1 is a plan sectional view schematically illustrating a configuration of a power transmission mechanism including a centrifugal clutch according to the present invention.
Figure 2:
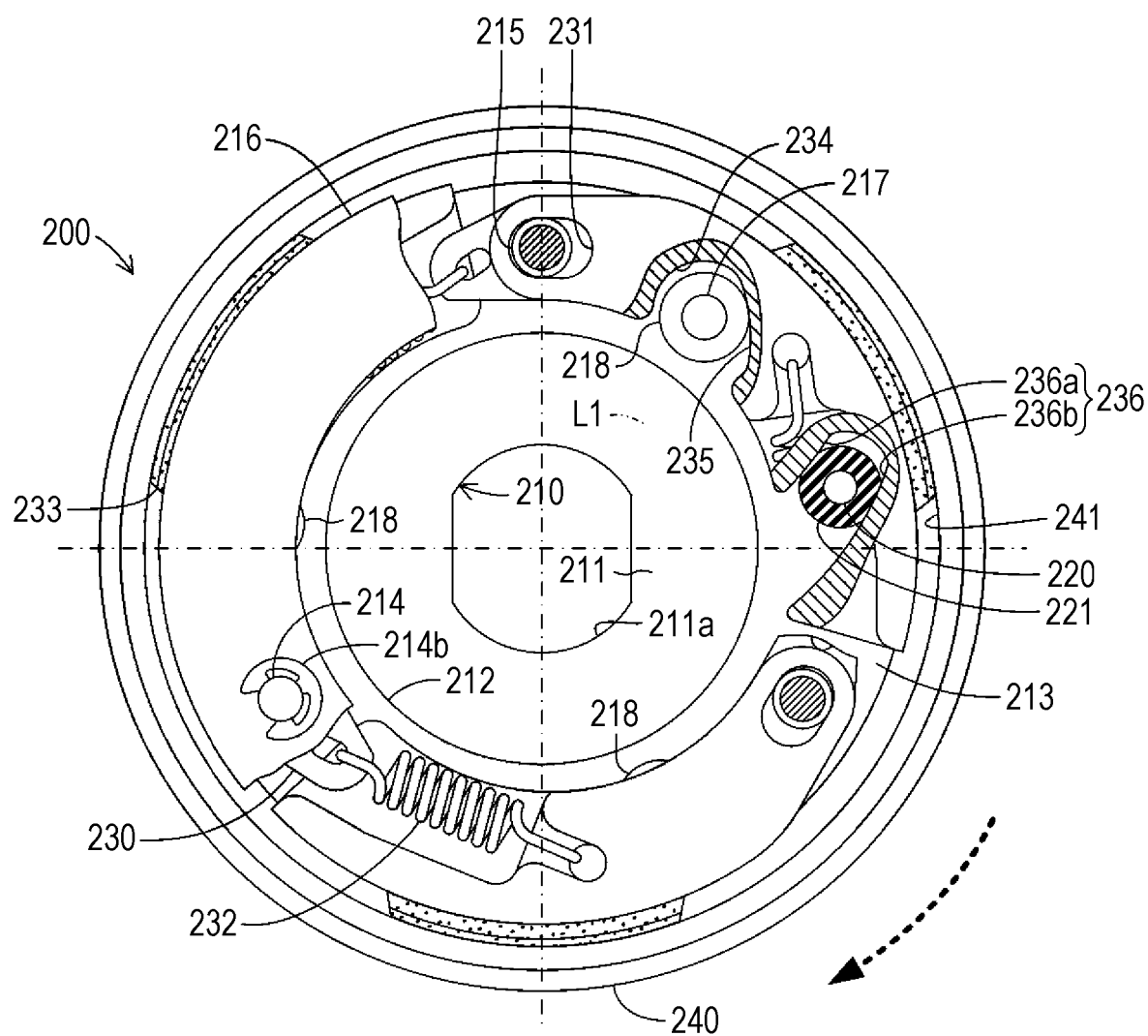
FIG. 2 is a side view of the centrifugal clutch as seen from a 2-2 line illustrated in FIG. 1.

Hereinafter, one embodiment of a centrifugal clutch according to the present invention will be described with reference to the drawings. FIG. 1 is a plan sectional view schematically illustrating a configuration of a power transmission mechanism 100 including a centrifugal clutch 200 according to the present invention. Moreover, FIG. 2 is a side view of the centrifugal clutch 200 as seen from a 2-2 line illustrated in FIG. 1. The power transmission mechanism 100 including the centrifugal clutch 200 is a mechanical device mainly provided between an engine and a rear wheel as a drive wheel in a motorcycle such as a scooter to transmit rotary drive force to the rear wheel or block such transmission while automatically changing a reduction ratio with respect to the number of rotations of the engine.

Configuration of Centrifugal Clutch 200

The power transmission mechanism 100 mainly includes each of a transmission 101 and the centrifugal clutch 200. The transmission 101 is a mechanical device configured to reduce speed steplessly to transmit the rotary drive force from the not-shown engine to the centrifugal clutch 200. The transmission 101 mainly includes each of a drive pulley 110, a V-belt 120, and a driven pulley 130. Of these components, the drive pulley 110 is provided on a crankshaft 111 extending from the engine, and is a mechanical device to be directly rotatably driven by the rotary drive force of the engine. The drive pulley 110 mainly includes each of a stationary drive plate 112 and a movable drive plate 113.

The stationary drive plate 112 is a component to be rotatably driven in a state in which the V-belt 120 is sandwiched and held by the stationary drive plate 112 and the movable drive plate 113. The stationary drive plate 112 is formed in such a manner that a metal material is formed into a conical tubular shape. The stationary drive plate 112 is attached onto the crankshaft 111 in a fixed manner in a state in which a raised-side surface of the stationary drive plate 112 faces a movable drive plate 113 side (an engine side). That is, the stationary drive plate 112 is constantly rotatably driven together with the crankshaft 111. Moreover, multiple radiation fins 112a are, on a recessed-side surface of the stationary drive plate 112, provided radially about the axis of the crankshaft 111.

The movable drive plate 113 is a component to be rotatably driven in a state in which the V-belt 120 is sandwiched and held by the movable drive plate 113 and the stationary drive plate 112. The movable drive plate 113 is formed in such a manner that a metal material is formed into a conical tubular shape. The movable drive plate 113 is attached to the crankshaft 111 in a state in which a raised-side surface of the movable drive plate 113 faces the stationary drive plate 112. In this case, the movable drive plate 113 is, through an impregnated bush, attached onto a sleeve bearing 114 fitted onto the crankshaft 111 in a fixed manner. The movable drive plate 113 is attached to the sleeve bearing 114 to freely slide in each of an axial direction and a circumferential direction.

On the other hand, on a recessed-side surface of the movable drive plate 113, multiple roller weights 115 are provided in a state in which the roller weights 115 are pressed by a lamp plate 116. The roller weight 115 is a component configured to displace outward in a radial direction according to an increase in the number of rotations of the movable drive plate 113 to press the movable drive plate 113 to a stationary drive plate 112 side in cooperation with the lamp plate 116. The roller weight 115 is formed in such a manner that a metal material is formed into a tubular shape. Moreover, the lamp plate 116 is a component configured to press the roller weights 115 to the movable drive plate 113 side. The lamp plate 116 is formed in such a manner that a metal plate is bent to the movable drive plate 113 side.

The V-belt 120 is a component configured to transmit rotary drive force of the drive pulley 110 to the driven pulley 130. The V-belt 120 is formed in such an endless ring shape that a core wire is covered with an elastic material such as rubber material. The V-belt 120 is arranged between the stationary drive plate 112 and the movable drive plate 113 and between a stationary driven plate 131 and a movable driven plate 134 of the driven pulley 130, and is bridged between the drive pulley 110 and the driven pulley 130.

The driven pulley 130 is a mechanical device to be rotatably driven by the rotary drive force from the engine, the rotary drive force being transmitted through each of the drive pulley 110 and the V-belt 120. The driven pulley 130 mainly includes each of the stationary driven plate 131 and the movable driven plate 134.

The stationary driven plate 131 is a component to be rotatably driven in a state in which the V-belt 120 is sandwiched and held by the stationary driven plate 131 and the movable driven plate 134. The stationary driven plate 131 is formed in such a manner that a metal material is formed into a conical tubular shape. The stationary driven plate 131 is attached onto a driven sleeve 132 in a fixed manner in a state in which a raised-side surface of the stationary driven plate 131 faces a movable driven plate 134 side.

The driven sleeve 132 is a metal tubular component to be rotatably driven together with the stationary driven plate 131. The driven sleeve 132 is attached to a drive shaft 133 to freely rotate relative to the drive shaft 133 through a bearing. The drive shaft 133 is a metal rotary shaft body configured to drive, through the not-shown transmission, the rear wheel of the motorcycle on which the power transmission mechanism 100 is mounted. In this case, the rear wheel of the motorcycle is attached to one (the right side as viewed in the figure) end portion of the drive shaft 133.

The movable driven plate 134 is a component to be rotatably driven in a state in which the V-belt 120 is sandwiched and held by the movable driven plate 134 and the stationary driven plate 131. The movable driven plate 134 is formed in such a manner that a metal material is formed into a conical tubular shape. The movable driven plate 134 is fitted onto the driven sleeve 132 to freely slide in the axial direction in a state in which a raised-side surface of the movable driven plate 134 faces the stationary driven plate 131.

On the other hand, a torque spring 135 is, on a recessed-side surface of the movable driven plate 134, provided between such a recessed-side surface and a drive plate 210 of the centrifugal clutch 200. The torque spring 135 is a coil spring configured to elastically press the movable driven plate 134 to a stationary driven plate 131 side. That is, the transmission 101 steplessly changes the number of rotations of the engine according to a size relationship between a diameter defined by a clearance between the stationary drive plate 112 and the movable drive plate 113 and provided to sandwich the V-belt 120 and a diameter defined by a clearance between the stationary driven plate 131 and the movable driven plate 134 and provided to sandwich the V-belt 120. Moreover, the centrifugal clutch 200 is provided on each tip end side of the driven sleeve 132 and the drive shaft 133.

The centrifugal clutch 200 is a mechanical device configured to transmit the rotary drive force, which has been transmitted through the transmission 101, of the engine to the drive shaft 133 or block such transmission. The centrifugal clutch 200 mainly includes each of the drive plate 210, three clutch weights 230, and a clutch outer 240.

Figure 3:
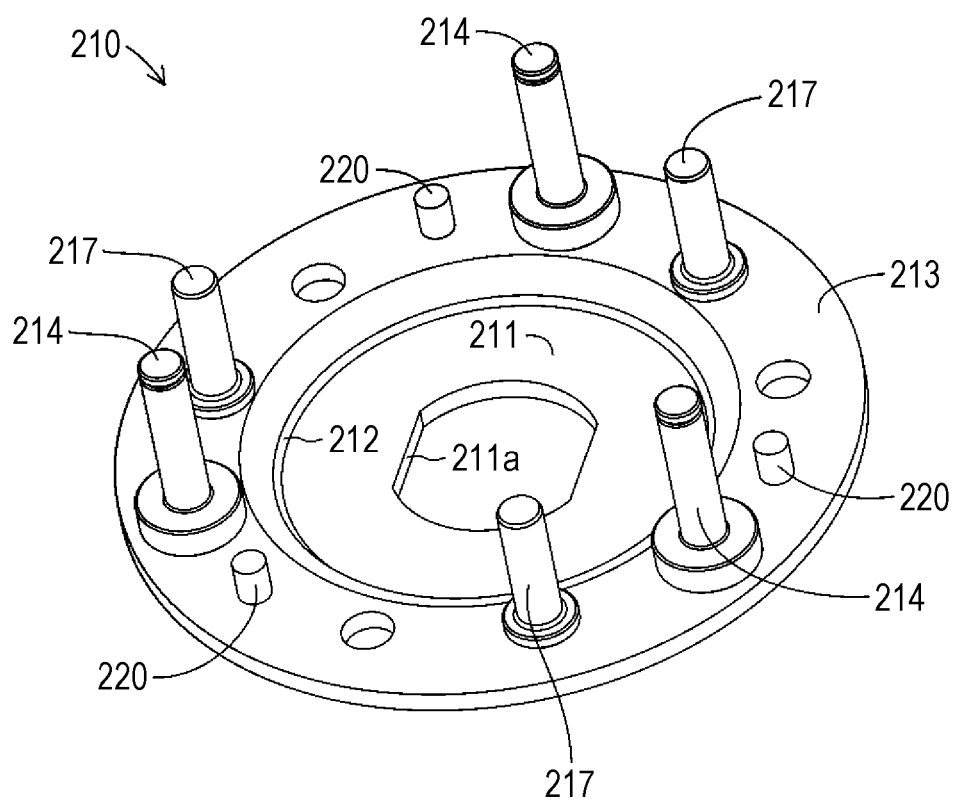
FIG. 3 is a perspective view schematically illustrating an external configuration of a drive plate in the centrifugal clutch illustrated in each of FIGS. 1 and 2.

The drive plate 210 is a component to be rotatably driven together with the driven sleeve 132. The drive plate 210 is formed in such a manner that a metal material is formed into a stepped discoid shape. More specifically, as illustrated in each of FIGS. 3 and 4, the drive plate 210 is formed with a through-hole 211a at a center portion of a flat plate-shaped bottom portion 211 such that the driven sleeve 132 penetrates the through-hole 211a, and is formed with a flange portion 213 at a tip end portion of a tube portion 212 standing at the periphery of the bottom portion 211 such that the flange portion 213 projects in a flange shape. At the flange portion 213, three swing support pins 214, three cam body support pins 217, and three damper receiving pins 220 are provided at equal intervals along the circumferential direction.

The swing support pin 214 is a component configured to turnably support one end side of a clutch weight 230 described later to swing the other end side. The swing support pin 214 is formed as a metal stepped rod. In this case, the swing support pin 214 is attached to the flange portion 213 in a fixed manner by an attachment bolt 214a. The swing support pin 214 provides support in a state in which the swing support pin 214 penetrates a pin slide hole 231 of the clutch weight 230 through a pivot-point-side slide member 215 at an outer peripheral portion of the swing support pins 214 and a state in which the clutch weight 230 is sandwiched through each of an E-ring 214b attached to a tip end portion of the swing support pin 214 and a side plate 216 arranged between the E-ring 214b and the clutch weight 230.

The pivot-point-side slide member 215 is a component arranged between the swing support pin 214 and the pin slide hole 231 to improve slidability therebetween. The pivot-point-side slide member 215 is formed in a cylindrical shape from a resin material. The pivot-point-side slide member 215 is formed to have such inner and outer diameters that the swing support pin 214 and the pin slide hole 231 can rotatably slide relative to each other, i.e., a dimensional tolerance as a clearance fit for each of the swing support pin 214 and the pin slide hole 231.

Moreover, thermoplastic resin or thermosetting resin having thermal resistance and abrasion resistance can be used as the resin material forming the pivot-point-side slide member 215, and engineering plastic or super engineering plastic is preferable. Specifically, polyetheretherketone resin (PEEK), polyphenylene sulfide resin (PPS), polyamide-imide resin (PAI), fluorine resin (PTFE), or polyimide resin (PI) can be used as the thermoplastic resin. Diallyphthalate resin (PDAP), epoxy resin (EP), or silicon resin (SI) can be used as the thermosetting resin. The side plate 216 is a component configured to prevent three clutch weights 230 from detaching from the swing support pins 214. The side plate 216 is formed in such a manner that a metal material is formed into a ring shape.

The cam body support pin 217 is a component configured to rotatably support a plate-side cam body 218. The cam body support pin 217 is formed as a metal stepped rod. With an attachment bolt 217a, the cam body support pin 217 is, in a fixed manner, attached onto the flange portion 213 facing a tip-end-side portion of the clutch weight 230 with respect to the pin slide hole 231.

The plate-side cam body 218 is a component configured to press the clutch weight 230 to a clutch outer 240 side. The plate-side cam body 218 is formed in such a manner that a resin material is formed into a cylindrical shape. In this case, the plate-side cam body 218 is formed to have such an inner diameter that the plate-side cam body 218 can rotatably slide on the cam body support pin 217, i.e., a dimensional tolerance as a so-called clearance fit for the cam body support pin 217. Moreover, the resin material forming the plate-side cam body 218 is similar to the resin material forming the pivot-point-side slide member 215.

The damper receiving pin 220 is a component configured to support a damper 221. The damper receiving pin 220 is formed as a metal rod. The damper 221 is a component configured to guide swing motion for causing the other end side of the clutch weight 230 to approach or separate from the clutch outer 240 and serving as a buffer material upon separation. The damper 221 is formed in such a manner that an elastic body such as a rubber material or an elastomer material is formed into a cylindrical shape. The damper 221 is fitted onto an outer peripheral surface of the damper receiving pin 220 in a fixed manner. Note that the damper 221 may be rotatably attached onto the outer peripheral surface of the damper receiving pins 220.

Figure 4:
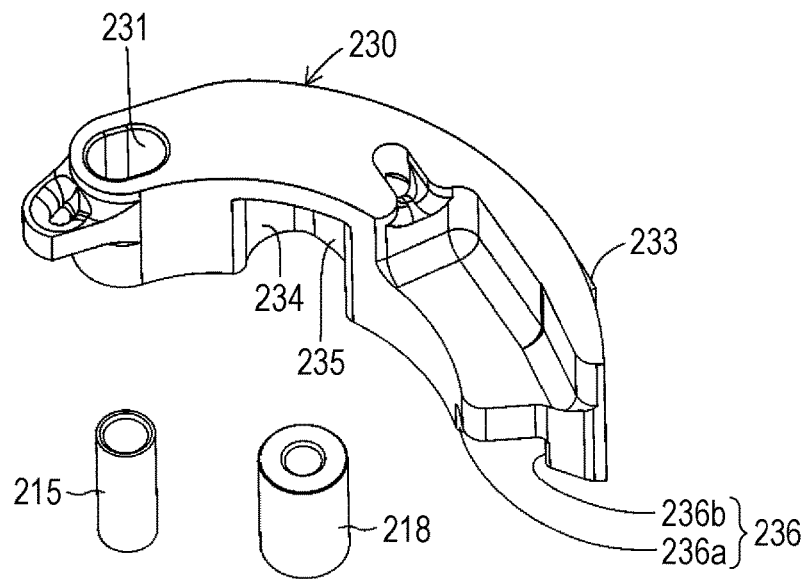
FIG. 4 is a partial exploded perspective view illustrating the state of assembly of the drive plate, a pivot-point-side slide member, a plate-side cam body, and a clutch weight in the centrifugal clutch illustrated in each of FIGS. 1 and 2.
Figure 5:
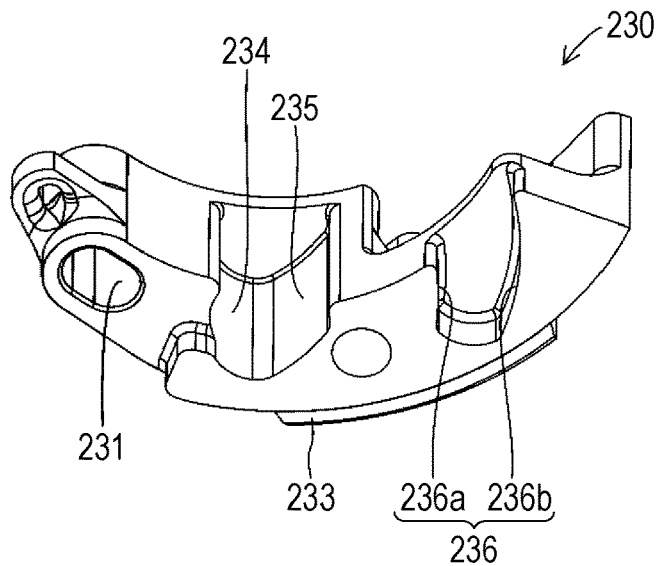
FIG. 5 is a perspective view schematically illustrating, as seen from a drive plate side, an external configuration of the clutch weight in the centrifugal clutch illustrated in each of FIGS. 1 and 2.

As illustrated in each of FIGS. 4 and 5, each of three clutch weights 230 is a component configured to contact or separate from the clutch outer 240 through a clutch shoe 233 according to the number of rotations of the drive plate 210 to transmit the rotary drive force from the engine to the drive shaft 133 or block such transmission. The clutch weight 230 is formed in such a manner that a metal material (e.g., a zinc material) is formed into a curved shape extending along the circumferential direction of the drive plate 210.

In each of these clutch weights 230, the other end side is coupled to adjacent one of the clutch weights 230 by a coupling spring 232 formed of a metal coil spring in a state in which one end side is turnably supported by the swing support pin 214 and the pivot-point-side slide member 215 through the pin slide hole 231. The other end side is pulled in an inward direction of the drive plate 210. That is, the clutch weight 230 is supported on the drive plate 210 through each of the swing support pin 214, the pivot-point-side slide member 215, and the pin slide hole 231 in a state in which the other end side provided with the clutch shoe 233 is swingable relative to the clutch outer 240.

Note that for the sake of simplicity in description of a configuration of the clutch weight 230, FIG. 2 illustrates surfaces, which are cut in different thickness directions, of two spots at one of three clutch weights 230. Further, FIG. 2 illustrates, by a dashed arrow, each of rotary drive directions of the drive plate 210 and the clutch outer 240 in the centrifugal clutch 200.

The pin slide hole 231 is a portion in which the swing support pin 214 of the drive plate 210 is turnably and slidably fitted through the pivot-point-side slide member 215. The pin slide hole 231 is formed as a through-hole penetrating the clutch weight 230 in the thickness direction thereof. The pin slide hole 231 is formed in a long hole shape such that one end side of the clutch weight 230 displaces backward in the rotary drive direction of the drive plate 210 when the clutch shoe 233 contacts the clutch outer 240.

In this case, a long hole forming the pin slide hole 231 is formed such that a length in one direction is longer than that in a width direction perpendicular to the one direction and the entirety of the long hole extends long and thin. More specifically, the pin slide hole 231 is formed to have an inner diameter as a clearance fit slightly larger than the outer diameter of the pivot-point-side slide member 215 in the width direction as the radial direction of the drive plate 210. On the other hand, a longitudinal direction of the pin slide hole 231 extends in an arc shape or a linear shape in such a direction that displacement of the clutch weight 230 to a side on which pressing of a weight-side cam body 235 of the clutch weight 230 against the plate-side cam body 218 is increased and climbing is more promoted is allowed.

In the present embodiment, the pin slide hole 231 is formed to extend in an arc shape to the front side in the rotary drive direction of the drive plate 210. In this case, in the present embodiment, two arcs forming the longitudinal direction of the pin slide hole 231 are concentric with the drive plate 210, but are not necessarily concentric.

The clutch shoe 233 is a component configured to increase friction force for an inner peripheral surface of the clutch outer 240. The clutch shoe 233 is formed in such a manner that a friction material is formed into a plate shape extending in an arc shape. The clutch shoe 233 is provided on an outer peripheral surface of each clutch weight 230 on a tip end side opposite to the pin slide hole 231.

Moreover, at a surface of each clutch weight 230 facing the drive plate 210, a plate-side cam body relief 234 in a shape recessed to cover the plate-side cam body 218 is formed, and a damper groove 236 in a shape recessed to cover the damper 221 is formed. The plate-side cam body relief 234 is a portion at which the weight-side cam body 235 configured to climb on the plate-side cam body 218 is formed. The plate-side cam body relief 234 is formed in a groove shape opening at an inner peripheral surface of the clutch weight 230 and extending to a far side, and is formed in such a manner that such a far-side portion is cut out in an arc shape not to contact the plate-side cam body 218.

The weight-side cam body 235 is a portion for displacing the clutch weight 230 to the clutch outer 240 side in cooperation with the plate-side cam body 218. The weight-side cam body 235 includes a smooth curved surface facing the rear side in the rotary drive direction of the drive plate 210. More specifically, the weight-side cam body 235 is formed in an arc shape, and a sliding surface to be pressed against the plate-side cam body 218 extends curved toward an outer rear side in the rotary drive direction of the drive plate 210.

The damper groove 236 is a portion for housing the damper 221 with the damper 221 being sandwiched by the damper groove 236. The damper groove 236 opens at the inner peripheral surface of the clutch weight 230. Further, the damper groove 236 is formed in a groove shape extending while curving along a turning displacement direction in which the clutch weight 230 approaches or separates from the clutch outer 240. More specifically, the damper groove 236 is formed in such a groove shape that a rear wall 236a formed on a pin slide hole 231 side on the rear side in the rotary drive direction of the drive plate 210 and a front wall 236b formed on a tip end side of the clutch weight 230 on the front side in the rotary drive direction of the drive plate 210 extend from the inner peripheral surface of the clutch weight 230 to a clutch shoe 233 side and are connected to each other at a portion before reaching the clutch shoe 233.

In this case, the damper groove 236 is formed such that a groove width W2 for fitting the damper 221 when the clutch weight 230 is at a clutch-ON position at which the clutch weight 230 is pressed against the clutch outer 240 expands to the front side in the rotary drive direction of the drive plate 210 as compared to a groove width W1 for fitting the damper 221 when the clutch weight 230 is at a clutch-OFF position at which the clutch weight 230 is separated from the clutch outer 240. In the present embodiment, in the damper groove 236, the groove width W1 is formed as such a groove width that the damper 221 is elastically deformed with a predetermined deformation amount. Further, the groove width W2 is formed as such a groove width that the damper 221 is elastically deformed with an amount equal to or smaller than the elastic deformation amount of the damper 221 at the portion with the groove width W1. The predetermined elastic deformation amount of the damper 221 at the portion with the groove width W1 as described herein is set to such an amount that when the clutch weight 230 approaches to contact the clutch outer 240 or separates from the clutch outer 240, smooth turning displacement can be performed while vibration and rattling (irregular reciprocating displacement greater than vibration) are suppressed.

Moreover, the rear wall 236a and the front wall 236b forming the damper groove 236 include arcs of circles about different positions. In the present embodiment, the rear wall 236a is formed of an arc of a circle about the center of the swing support pin 214 in a state (see FIG. 6) in which the clutch weight 230 is separated from the clutch outer 240 and is displaced to the innermost side in the radial direction. In this case, the rear wall 236a is formed of a curved surface separated from the damper 221 when the clutch shoe 233 contacts the clutch outer 240 in a terminal state in which the clutch shoe 233 has been abraded to an amount close to a use limit.

On the other hand, the front wall 236b includes an arc of a circle about a position on the tip end side of the clutch weight 230 with respect to the center of the arc forming the rear wall 236a such that the groove width W2 on an inner peripheral side of the clutch weight 230 is greater than the groove width W1. In this case, the front wall 236b is formed with a length longer than a portion contacting the damper 221 when the clutch shoe 233 contacts the clutch outer 240 in the terminal state. That is, each of the rear wall 236a and the front wall 236b includes the arc with a single curvature.

The clutch outer 240 is a component to be rotatably driven together with the drive shaft 133. The clutch outer 240 is formed in such a manner that a metal material is formed into a cup shape covering the outer peripheral surface of the clutch weight 230 from the drive plate 210. That is, the clutch outer 240 has a cylindrical surface 241 configured to friction-contact the clutch shoe 233 of the clutch weight 230 displaced to an outer peripheral side of the drive plate 210.

Operation of Centrifugal Clutch 200

Next, operation of the centrifugal clutch 200 configured as described above will be described with reference to FIGS. 6 to 12. Note that in FIGS. 6 to 12, the E-ring 214b, the side plate 216, and the coupling spring 232 are not shown. Moreover, in FIGS. 7 to 9, 11, and 12, the rotary drive directions of the drive plate 210 and the clutch outer 240 in the centrifugal clutch 200 are each indicated by dashed arrows. Further, in FIGS. 8, 9, and 12, a rotation direction of the plate-side cam body 218 is indicated by a dashed arrow. In addition, FIGS. 6 to 9 illustrate an operation state of the centrifugal clutch 200 in an initial state in which there is no or little abrasion of the clutch shoe 233.

Figure 6:
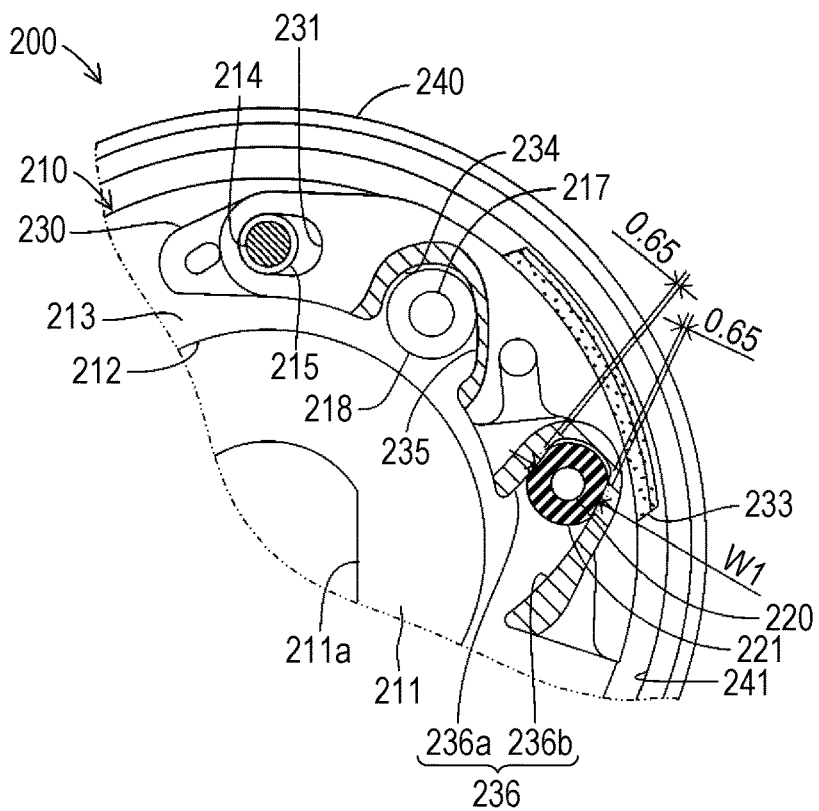
FIG. 6 is a partially-enlarged view illustrating a disconnection state in which a clutch shoe does not contact a clutch outer in the centrifugal clutch illustrated in FIG. 2.

The centrifugal clutch 200 functions as part of the power transmission mechanism 100 arranged between the engine and the rear wheel as the drive wheel in the motorcycle (e.g., the scooter). First, in a case where the engine is in an idling state, the centrifugal clutch 200 blocks transmission of the drive force between the engine and the drive shaft 133 as illustrated in FIG. 6. Specifically, in the centrifugal clutch 200, the drive plate 210 is rotatably driven and the clutch weight 230 is rotatably driven by the rotary drive force of the engine transmitted through the transmission 101.

However, in this case, in the centrifugal clutch 200, centrifugal force acting on the clutch weight 230 is smaller than elastic force (pull force) of the coupling spring 232. Thus, the clutch shoes 233 do not contact the cylindrical surface 241 of the clutch outer 240, and therefore, the centrifugal clutch 200 is in the clutch-OFF state in which the rotary drive force of the engine is not transmitted to the drive shaft 133. In this clutch-OFF state, the clutch weight 230 is pulled by the pull force of one of two coupled coupling springs 232 pulling from a position far from the swing support pin 214 (the coupling spring 232 hooked at a position adjacent to the weight-side cam body 235).

In this case, the pin slide hole 231 is formed in the long hole shape, and therefore, the clutch weight 230 displaces to the side of the coupling spring 232 hooked at the position adjacent to the weight-side cam body 235. With this configuration, the swing support pin 214 is positioned at a rear end portion of the pin slide hole 231 in the rotary drive direction of the drive plate 210 (see FIG. 6). Moreover, the weight-side cam body 235 maintains, by the elastic force (the pull force) of the coupling spring 232, a state in which the weight-side cam body 235 is pressed to contact a roller surface of the plate-side cam body 218.

Further, in this clutch-OFF state, the vicinity of the farmost portion of the damper groove 236 is pressed against the damper 221 by the elastic force (the pull force) of the coupling spring 232, and the clutch weight 230 is elastically stopped. That is, the damper 221 is positioned in a state in which the damper 221 is elastically deformed with the damper 221 being sandwiched between the rear wall 236a and the front wall 236b at the position with the groove width W1 in the vicinity of the farmost portion of the damper groove 236. In the present embodiment, a rear wall 236a side of the damper 221 is compressed and deformed by 0.65 mm, and a front wall 236b side is compressed and deformed by 0.65 mm. Note that each of elastic deformation amounts of the damper 221 on the rear wall 236a side and the front wall 236b side is not limited to that in the present embodiment, needless to say.

On the other hand, the centrifugal clutch 200 transmits the rotary drive force of the engine to the drive shaft 133 according to an increase in the number of rotations of the engine by driver's accelerator operation in the motorcycle. Specifically, in the centrifugal clutch 200, the centrifugal force acting on the clutch weight 230 becomes greater than the elastic force (the pull force) of the coupling spring 232 as the number of rotations of the engine increases. Thus, the clutch weight 230 turnably displaces outward in the radial direction about the swing support pin 214.

Figure 7:
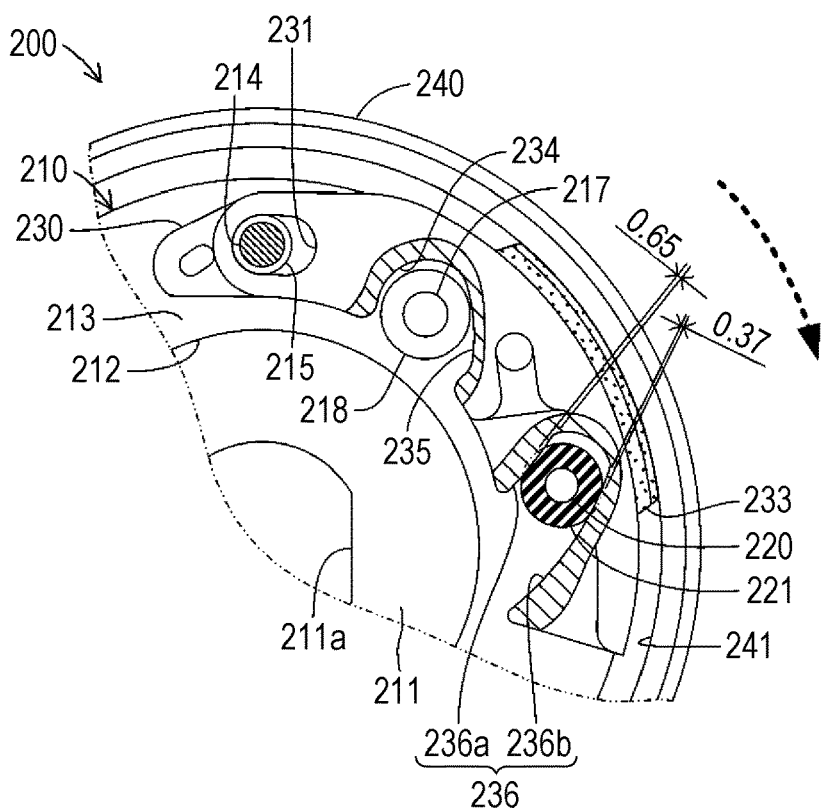
FIG. 7 is a partially-enlarged view illustrating a state in which the clutch shoe contacts the clutch outer in an initial state in which there is no or little abrasion of the clutch shoe in the centrifugal clutch illustrated in FIG. 6.

That is, in the centrifugal clutch 200, the clutch weight 230 turnably displaces to a cylindrical surface 241 side of the clutch outer 240 against each of the elastic force (the pull force) of the coupling spring 232 and sliding resistance between the damper 221 and the damper groove 236 as the number of rotations of the engine increases, as illustrated in FIG. 7. As a result, the clutch shoe 233 contacts the cylindrical surface 241. In this case, in the clutch weight 230, the damper groove 236 is formed such that the groove width expands to the front side in the rotary drive direction of the drive plate 210 from the clutch shoe 233 side toward the inner peripheral side of the clutch weight 230. Thus, the sliding resistance between the damper 221 and the damper groove 236 decreases.

With these configurations, the clutch weight 230 can smoothly turnably displace while the swing support pin 214 and the pin slide hole 231 are sliding on each other through the resin pivot-point-side slide member 215. In the present embodiment, a compression deformation amount of the damper 221 when the clutch shoe 233 contacts the cylindrical surface 241 is 0.65 mm on the rear wall 236a side, and is 0.37 mm on the front wall 236b side. Note that the plate-side cam body 218 and the weight-side cam body 235 do not contact each other until the clutch weight 230 illustrated in FIG. 7 contacts the clutch outer 240 after having turned outward in the radial direction of the drive plate 210.

Figure 8:
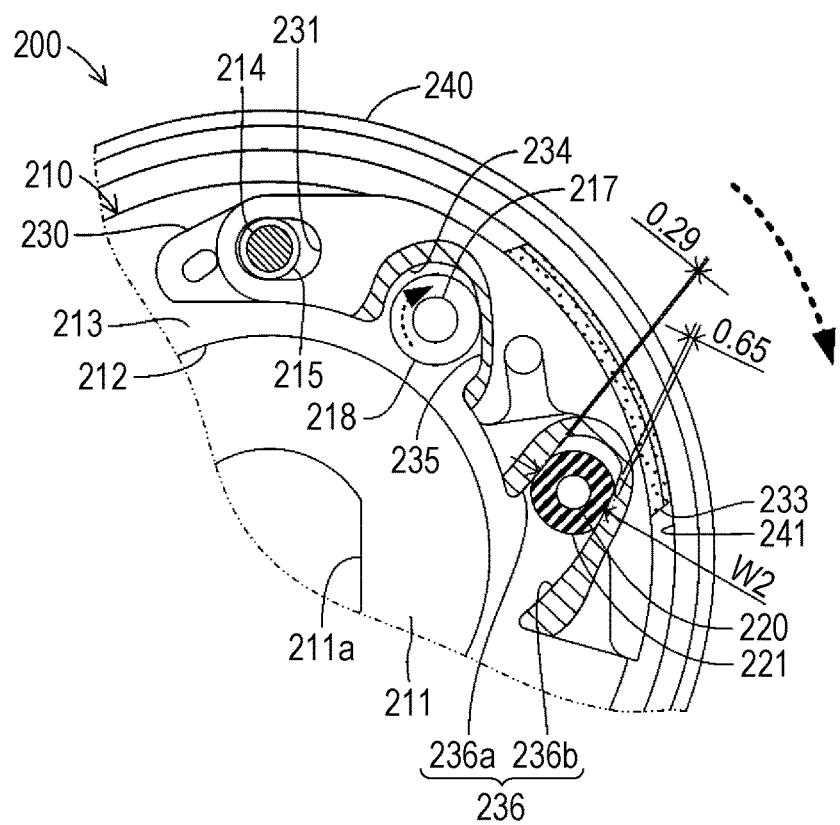
FIG. 8 is a partially-enlarged view illustrating a coupling state in which the clutch shoe is pressed against the clutch outer in the centrifugal clutch illustrated in FIG. 7.

Next, in a case where the clutch shoe 233 contacts the cylindrical surface 241, the clutch weight 230 receives reactive force in the opposite direction of the rotary drive direction through the clutch shoe 233. In this case, the pin slide hole 231 is formed in the long hole shape along the circumferential direction of the drive plate 210, and the swing support pin 214 is positioned at the rear end portion of the pin slide hole 231 in the rotary drive direction of the drive plate 210. That is, as illustrated in FIG. 8, the clutch weight 230 is in a state in which backward displacement in the rotary drive direction of the drive plate 210 is allowed. Thus, the clutch weight 230 relatively displaces in the opposite direction of the rotary drive direction of the drive plate 210 by the reactive force received through the clutch shoe 233.

In this case, the damper groove 236 is also formed such that the groove width expands to the front side in the rotary drive direction of the drive plate 210 from the clutch shoe 233 side to the inner peripheral side of the clutch weight 230. Further, the swing support pin 214 and the pin slide hole 231 slide on each other through the resin pivot-point-side slide member 215. Thus, the clutch weight 230 can smoothly displace. Moreover, the clutch weight 230 is formed such that the groove width W2 of the damper groove 236 is such a groove width that the damper 221 is elastically deformed with the amount equal to or smaller than the elastic deformation amount of the damper 221 at the portion with the groove width W1. Thus, the sliding resistance upon displacement of the clutch weight 230 does not exceed the sliding resistance at the portion with the groove width W1, and does not interfere with smooth displacement.

Accordingly, the weight-side cam body 235 formed at the clutch weight 230 is strongly pressed against the plate-side cam body 218. In this case, the plate-side cam body 218 is rotatably supported on the cam body support pins 217. Thus, the plate-side cam body 218 rotates counterclockwise as viewed in the figure by pressing by the weight-side cam body 235. Thus, in the clutch weight 230, the clutch shoe 233 is pushed to the clutch outer 240 side on the outside in the radial direction and is pressed against the cylindrical surface 241 as the weight-side cam body 235 climes on the plate-side cam body 218 while rotatably displacing the plate-side cam body 218. In this case, the plate-side cam body 218 is made of the resin material, and therefore, the plate-side cam body 218 can smoothly rotatably displace as compared to a case where both components are made of a metal material.

As a result, in the centrifugal clutch 200, after the clutch shoes 233 have contacted the cylindrical surface 241 of the clutch outer 240, the clutch shoes 233 are pressed against the cylindrical surface 241 in extremely-short time (in other words, instantaneously). Thus, the centrifugal clutch 200 is brought into a state in which the clutch weight 230 enters a portion between the plate-side cam body 218 and the clutch outer 240 in a wedge manner. Accordingly, the centrifugal clutch 200 is brought into a clutch-ON state in which the rotary drive force of the engine is fully transmitted to the drive shaft 133.

In this case, the pin slide hole 231 is formed with such a length that contact with the swing support pin 214 is avoided in a state in which the clutch weight 230 enters the portion between the plate-side cam body 218 and the clutch outer 240 in the wedge manner. That is, in the pin slide hole 231, a clearance is ensured between the pin slide hole 231 and the pivot-point-side slide member 215 even in a state in which the clutch weight 230 enters the portion between the plate-side cam body 218 and the clutch outer 240 in the wedge manner. This prevents interference with entrance of the clutch weight 230 into the portion between the plate-side cam body 218 and the clutch outer 240.

In this clutch-ON state, the centrifugal clutch 200 maintains a state in which the clutch shoes 233 are pressed against the cylindrical surface 241 of the clutch outer 240. Thus, the drive plate 210 and the clutch outer 240 are rotatably driven together. With this configuration, the rear wheel of the motorcycle is rotatably driven by the rotary drive force of the engine so that the motorcycle can run.

On the other hand, in a case where the number of rotations of the engine decreases, the centrifugal clutch 200 blocks transmission of the rotary drive force of the engine to the drive shaft 133. Specifically, in the centrifugal clutch 200, the centrifugal force acting on the clutch weight 230 becomes smaller than the elastic force (the pull force) of the coupling spring 232 as the number of rotations of the engine decreases. Thus, the clutch weight 230 turnably displaces inward in the radial direction about the swing support pin 214.

Figure 9:
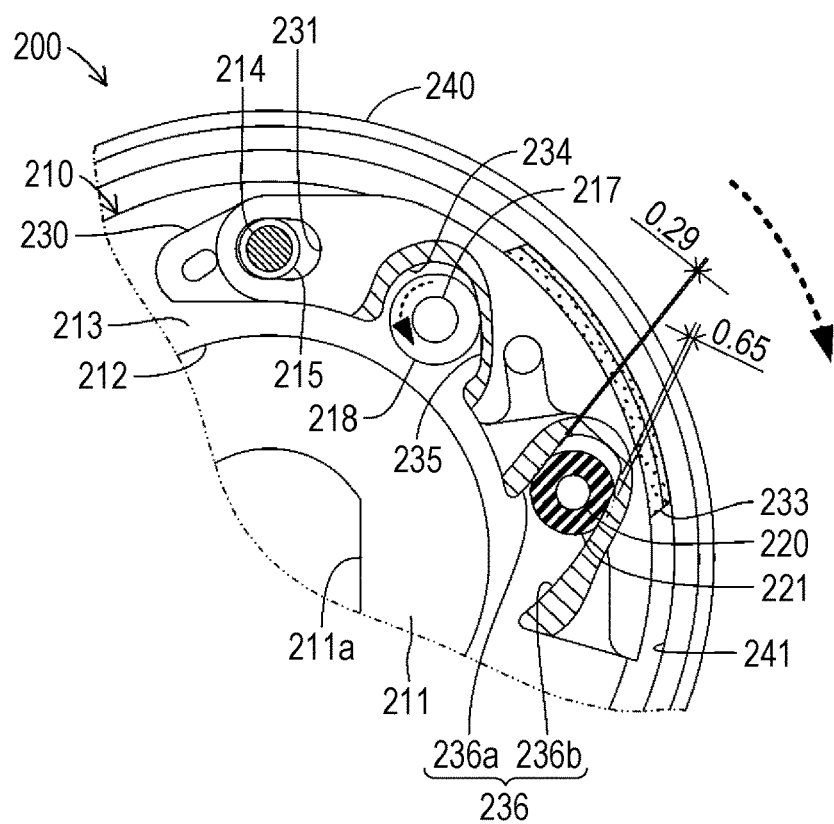
FIG. 9 is a partially-enlarged view illustrating a state right before the clutch weight tilts inward in a radial direction of the drive plate in the centrifugal clutch illustrated in FIG. 8.

In this case, as illustrated in FIG. 9, the pin slide hole 231 is formed in the long hole shape along the circumferential direction of the drive plate 210, and the swing support pin 214 is positioned slightly on the front side with respect to the rear end portion of the pin slide hole 231 in the rotary drive direction of the drive plate 210. That is, the clutch weight 230 is in a state in which forward displacement in the rotary drive direction of the drive plate 210 is allowed. Thus, the clutch weight 230 rotatably displaces relative to the drive plate toward the front side in the rotary drive direction of the drive plate 210 by the elastic force (the pull force) of the coupling spring 232.

In this case, the damper 221 turnably displaces against the sliding resistance between the damper 221 and the damper groove 236 such that the clutch weight 230 displaces from a groove width W2 side to a groove width W1 side of the damper groove 236. Accordingly, the clutch weight 230 turnably displaces to each of the front side in the rotary drive direction of the drive plate 210 and the inside in the radial direction to return to an original position (a position upon idling as described above) (see FIG. 6) while the weight-side cam body 235 is rotatably displacing the plate-side cam body 218 clockwise as viewed in the figure. That is, the centrifugal clutch 200 is brought into the clutch-OFF state in which the clutch shoes 233 do not contact the clutch outer 240 and no rotary drive force is transmitted.

Moreover, the clutch weight 230 displaces to the side of one of two coupled coupling springs 232 pulling from the position far from the swing support pin 214 (the coupling spring 232 hooked at the position adjacent to the weight-side cam body 235). Thus, the swing support pin 214 is positioned at the rear end portion of the pin slide hole 231 in the rotary drive direction of the drive plate 210 (see FIG. 6). Even in a case where the number of rotations of the engine decreases as described above, the clutch weight 230 can smoothly turnably displace by the resin pivot-point-side slide member 215 and the resin plate-side cam body 218.

Figure 10:
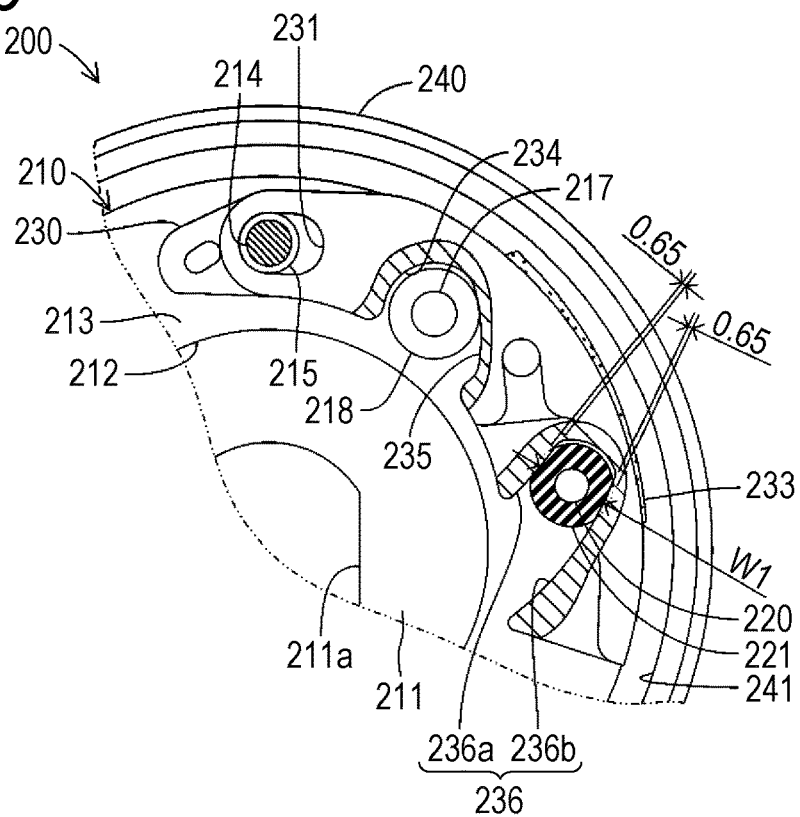
FIG. 10 is a partially-enlarged view illustrating a disconnection state in which the clutch shoe does not contact the clutch outer in a state in which the thickness of the clutch shoe is abraded to a terminal state close to a use limit in the centrifugal clutch illustrated in FIG. 6.

Next, a case where abrasion of the clutch shoe 233 has progressed and the clutch shoe 233 has become thinner and approached the terminal state close to the use limit as illustrated in FIG. 10 will be described. In this terminal state of the clutch shoe 233, the centrifugal clutch 200 is also brought into the clutch-ON state through a process similar to that described above. That is, in the course of bringing the clutch-ON state, the clutch weight 230 turnably displaces outward in the radial direction of the drive plate 210 by an amount corresponding to an abrasion amount of the clutch shoe 233. Thereafter, the clutch weight 230 turnably displaces backward in the rotary drive direction.

Figure 11:
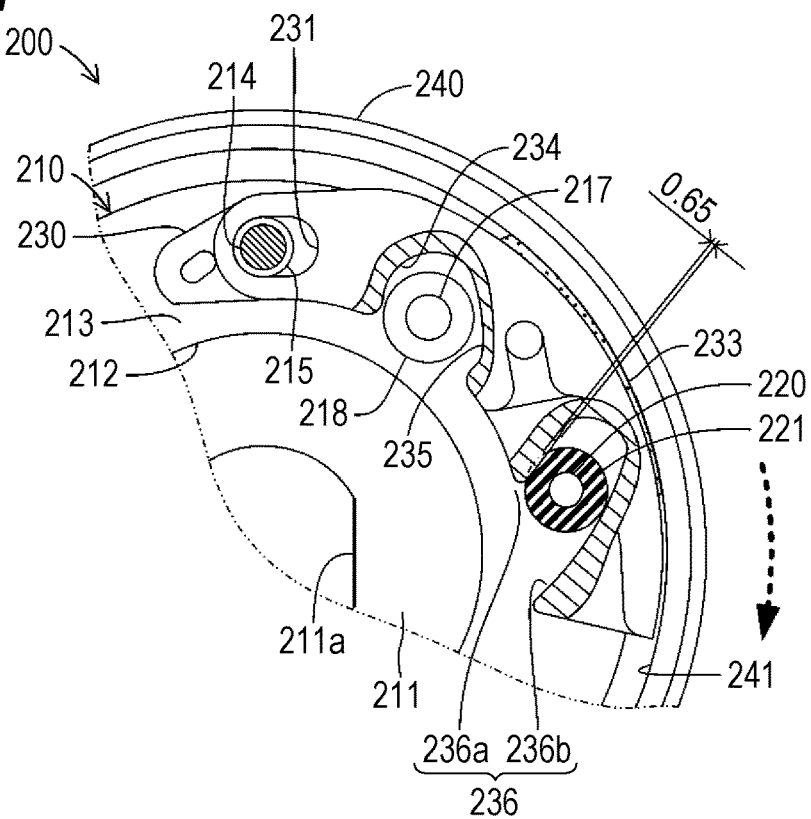
FIG. 11 is a partially-enlarged view illustrating a state in which the clutch shoe contacts the clutch outer in the centrifugal clutch illustrated in FIG. 10.

Thus, regarding the amount of compression deformation of the damper 221 by the damper groove 236, in a case where the clutch shoe 233 contacts the cylindrical surface 241 of the clutch outer 240 as illustrated in FIG. 11, the compression deformation amount on the front wall 236b side is smaller than that in a case where the clutch shoe 233 is in the initial state. In the present embodiment, the compression deformation amount of the damper 221 is 0.65 mm on the rear wall 236a side. On the other hand, the damper 221 is in a non-contact state on the front wall 236b, and therefore, no compression deformation occurs. For this reason, the clutch weight 230 easily displaces from the position in the clutch-OFF state.

Figure 12:
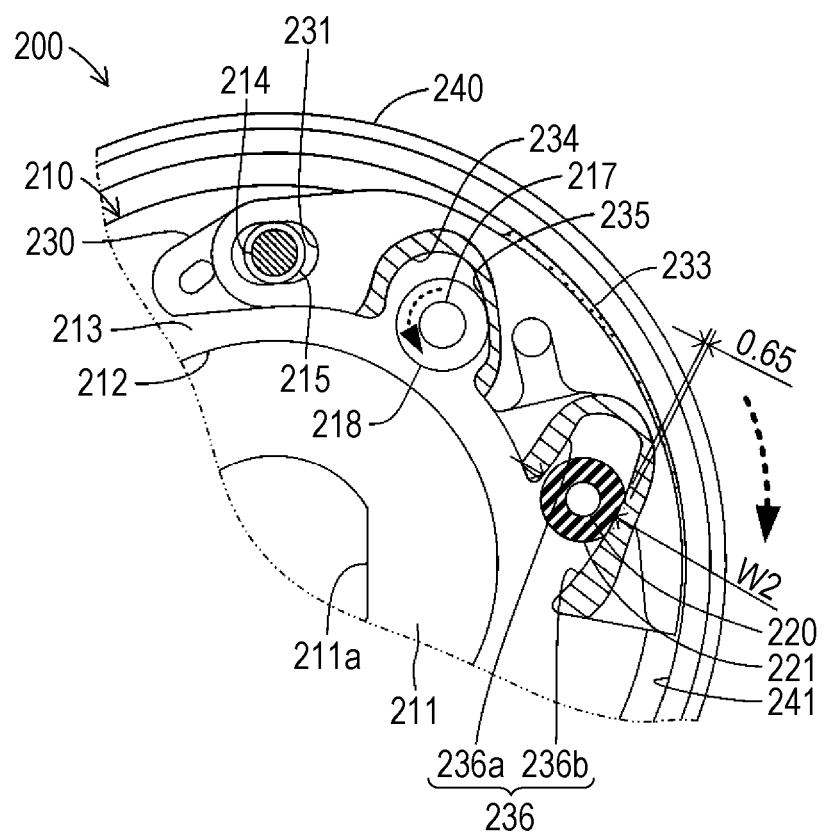
FIG. 12 is a partially-enlarged view illustrating a coupling state in which the clutch shoe is pressed against the clutch outer in the centrifugal clutch illustrated in FIG. 11.

In a case where the clutch weight 230 displaces backward in the rotary drive direction of the drive plate 210, compression deformation of the damper 221 occurs on the front wall 236b as illustrated in FIG. 12. In the present embodiment, the compression deformation amount of the damper 221 on the front wall 236b side is 0.65 mm. That is, the compression deformation amount of the damper 221 on the front wall 236b side does not exceed the compression deformation amount upon clutch-OFF.

Moreover, in this case, the front wall 236b is formed with the length longer than the portion contacting the damper 221 when the clutch shoe 233 contacts the clutch outer 240 in the terminal state. Thus, excessive compression deformation such as crushing of a corner portion such as a tip end portion of the front wall 236b in the longitudinal direction due to a concentrated load is prevented at the damper 221. Consequently, the centrifugal clutch 200 can prevent damage of the damper 221, and can prevent an increase in the sliding resistance due to the excessive compression deformation when the clutch weight 230 displaces to the front side in the rotary drive direction of the drive plate 210.

On the other hand, no compression deformation of the damper 221 at the rear wall 236a occurs. This is because the rear wall 236a is formed of the curved surface separated from the damper 221 when the clutch shoe 233 contacts the clutch outer 240 in the terminal state in which the clutch shoe 233 has been abraded to the amount close to the use limit.

In the centrifugal clutch 200, the plate-side cam body 218 rotates, as illustrated in FIG. 12, relative to the protruding body support pin 217 by an amount corresponding to the abrasion amount of the clutch shoe 233. Thus, the clutch weight 230 enters the portion between the plate-side cam body 218 and the clutch outer 240 in the wedge manner, and the clutch shoe 233 presses the cylindrical surface 241 of the clutch outer 240. That is, after the clutch shoes 233 have contacted the cylindrical surface 241 of the clutch outer 240, the clutch shoes 233 are pressed against the cylindrical surface 241 in extremely-short time (in other words, instantaneously). Thus, the centrifugal clutch 200 is brought into the clutch-ON state in which the rotary drive force of the engine is fully transmitted to the drive shaft 133.

As can be understood from operation description above, according to the above-described embodiment, in the centrifugal clutch 200, the groove width for the damper 221 is formed such that the groove width W2 of the portion in which the damper 221 is fitted at the position at which the clutch weight 230 contacts the clutch outer 240 expands to the front side in the rotary drive direction of the drive plate 210 as compared to the groove width W1 of the portion in which the damper 221 is fitted at the position at which the clutch weight 230 is separated from the clutch outer 240. With this configuration, in the centrifugal clutch 200 according to the present invention, in a case where the clutch weight 230 displaces to the rear side in the rotary drive direction of the drive plate 210, the clutch weight 230 can smoothly displace without interference with displacement of the clutch weight 230, and assist thrust can be stably generated.

Further, implementation of the present invention is not limited to the above-described embodiment, and various changes can be made without departing from the gist of the present invention.

For example, in the above-described embodiment, the groove width W2 of the damper groove 236 in which the damper 221 is fitted in the clutch-ON state is formed as such a groove width that the damper 221 is elastically deformed with the same deformation amount as the elastic deformation amount of the damper 221 at the portion with the groove width W1 in the clutch-OFF state. However, it may be enough that the damper groove 236 is formed such that the groove width W2 for fitting the damper 221 at a clutch-ON position at which the clutch weight 230 is pressed against the clutch outer 240 expands to the front side in the rotary drive direction of the drive plate 210 as compared to the groove width W1 for fitting the damper 221 at a clutch-OFF position at which the clutch weight 230 is separated from the clutch outer 240. Thus, groove width W2 of the damper groove 236 in which the damper 221 is fitted in the clutch-ON state can be also formed as such a groove width that the damper 221 is elastically deformed with a deformation amount smaller than the elastic deformation amount of the damper 221 at the portion with the groove width W1 in the clutch-OFF state or the damper 221 is not elastically deformed.

Moreover, in the above-described embodiment, the damper groove 236 is configured such that the compression deformation amount of the damper 221 on the front wall 236*b* side when the clutch shoes 233 of the clutch weights 230 contact the cylindrical surface 241 of the clutch outer 240 in the course of transition between the clutch-OFF state and the clutch-ON state is smaller than those before and after such a state. With this configuration, the sliding resistance when the clutch weight 230 displaces outward in the radial direction of the drive plate 210 from the clutch-OFF state and when the clutch weight 230 displaces inward in the radial direction of the drive plate 210 to separate from the clutch outer 240 can be decreased, and the clutch weight 230 can easily displace.

However, in the damper groove 236, the compression deformation amount of the damper 221 can be constant in the course of transition between the clutch-OFF state and the clutch-ON state. In this case, in the damper groove 236, a portion of the front wall 236*b* contacting the damper 221 when the clutch shoe 233 of the clutch weight 230 contacts the cylindrical surface 241 of the clutch outer 240 is, for example, formed of a curved surface partially projecting inward of the damper groove 236. With this configuration, the compression deformation amount of the damper 221 can be increased.

Further, in the above-described embodiment, in the damper groove 236, the rear wall 236*a* is formed of the curved surface separated from the damper 221 when the clutch weight 230 displaces backward in the rotary drive direction of the drive plate 210. However, the rear wall 236*a* can be formed such that contact with the damper 221 is maintained when the clutch weight 230 displaces backward in the rotary drive direction of the drive plate 210. That is, in the damper groove 236, each of the rear wall 236*a* and the front wall 236*b* can include a curved surface with two or more curvatures. In this case, in the damper groove 236, at least one of two or more curved surfaces forming the rear wall 236*a* and at least one of two or more curved surfaces forming the front wall 236*b* can include curved surfaces including arcs about the same position.

In addition, in the above-described embodiment, the front wall 236*b* of the damper groove 236 is formed with the length longer than the portion contacting the damper 221 when the clutch shoe 233 contacts the clutch outer 240 in the terminal state. However, the front wall 236*b* can be also formed with a length to the portion contacting the damper 221 when the clutch shoe 233 contacts the clutch outer 240 in the terminal state. According to this configuration, the centrifugal clutch 200 can realize size and weight reduction of the clutch weight 230.

Moreover, in the above-described embodiment, in the centrifugal clutch 200, the plate-side cam body 218 provided at the drive plate 210 includes the rotatable roller, and the weight-side cam body 235 formed at the clutch weight 230 includes the curved surface. That is, in the centrifugal clutch 200, each of the plate-side cam body 218 and the weight-side cam body 235 sliding on each other and forming a pair of cams includes the curved surface. However, it may be enough that the plate-side cam body 218 and the weight-side cam body 235 include the pair of cams sliding on each other. Thus, in the centrifugal clutch 200, at least one of the plate-side cam body 218 or the weight-side cam body 235 may be formed and configured in a linear planar shape.

Further, in the above-described embodiment, the plate-side cam body 218 includes the roller rotatable on the drive plate 210. However, it may be enough that the plate-side cam body 218 has a surface formed to project outward of an outer peripheral portion of the drive plate 210, having a shape pushing out the clutch weight 230 through the weight-side cam body 235, and extending in a rotary drive axis direction of the drive plate 210, i.e., a surface standing on a plate surface of the drive plate 210 and extending to a clutch weight 230 side.

That is, at least one of the plate-side cam body 218 or the weight-side cam body 235 may be formed to extend outward of the drive plate 210 toward the rear side in the rotary drive direction of the drive plate 210. Of the plate-side cam body 218 and the weight-side cam body 235, portions extending toward the rear side in the rotary drive direction of the drive plate 210 and extending outward of the drive plate 210 may be, in this case, formed across the entirety or part of the plate-side cam body 218 and the weight-side cam body 235. Thus, in the centrifugal clutch 200, the plate-side cam body 218 can be, for example, formed in a non-rotatable non-slidable fixed state on the drive plate 210.

The plate-side cam body 218 can be made of a material other than the resin material, such as a metal material (e.g., carbon steel, an iron-based sintered material, or an aluminum material). In this case, the plate-side cam body 218 can be made of the same material as that of the cam body support pin 217 or the weight-side cam body 235, or can be made of a material different from that of the cam body support pin 217 or the weight-side cam body 235. Alternatively, the plate-side cam body 218 is made of a more-easily-abradable material than the material(s) forming the cam body support pin 217 and/or the weight-side cam body 235, and therefore, abrasion of the cam body support pin 217 and/or the weight-side cam body 235 can be reduced. Alternatively, the plate-side cam body 218 is made of a material (e.g., an aluminum material) having better slidability than that of the material(s) forming the cam body support pin 217 and/or the weight-side cam body 235, and therefore, the slidability between the cam body support pin 217 and the weight-side cam body 235 can be improved. Alternatively, the plate-side cam body 218 can be also made of a material (e.g., a metal material or a ceramic material) having thermal resistance and abrasion resistance.

Further, in the above-described embodiment, the centrifugal clutch 200 is configured such that the swing support pins 214 are provided at the drive plate 210 and the pin slide holes 231 are provided at the clutch weights 230. However, one of the swing support pin 214 or the pin slide hole 231 may be provided at the drive plate 210 or the clutch weight 230, and the other one of the swing support pin 214 or the pin slide hole 231 may be provided at the clutch weight 230 or the drive plate 210. Thus, the centrifugal clutch 200 can be also configured such that the swing support pins 214 are provided at the clutch weights 230 and the pin slide holes 231 are provided at the drive plate 210.

Moreover, in the above-described embodiment, the pin slide hole 231 is formed as the arc-shaped through-hole. However, it is enough to form the pin slide hole 231 as the long hole allowing backward displacement of the clutch weight 230 in the rotary drive direction of the drive plate 210 in a state (see FIG. 6) in which the clutch shoe 233 of the clutch weight 230 is most separated from the cylindrical surface 241 of the clutch outer 240. Thus, the pin slide hole 231 is not limited to that of the above-described embodiment.

Thus, the pin slide hole 231 can be formed in a linear shape extending in a tangential direction perpendicular to the radial direction of the drive plate 210. Alternatively, the pin slide hole 231 can be also formed as a so-called blind hole opening on one side and closed on the other side.

Moreover, in the above-described embodiment, the pivot-point-side slide member 215 is formed in the cylindrical shape from the resin material, and is rotatably slidably provided at the outer peripheral portion of the swing support pin 214. In other words, the pivot-point-side slide member 215 is configured to function as a roller for the swing support pin 214. However, it is enough to provide the pivot-point-side slide member 215 between the swing support pin 214 and the pin slide hole 231 to slidably displace these components.

Thus, the pivot-point-side slide member 215 can be made of other materials than the resin material, such as a metal material. In this case, the pivot-point-side slide member 215 may be made of the same material as that of the swing support pin 214 or the pin slide hole 231, or may be made of a material different from that of the swing support pin 214 or the pin slide hole 231. In this case, the pivot-point-side slide member 215 is made of a more-easily-abradable material than the material(s) forming the swing support pin 214 and/or the pin slide hole 231, and therefore, abrasion of the swing support pin 214 and/or the pin slide hole 231 can be reduced. Alternatively, the pivot-point-side slide member 215 is made of a material (e.g., an aluminum material) having better slidability than that of the material(s) forming the swing support pin 214 and/or the pin slide hole 231, and therefore, the slidability between the swing support pin 214 and the pin slide hole 231 can be improved. Alternatively, the pivot-point-side slide member 215 can be also made of a material (e.g., a metal material or a ceramic material) having thermal resistance and abrasion resistance.

Further, the pivot-point-side slide member 215 can be provided in a non-rotatable non-slidable fixed state at the outer peripheral portion of the swing support pin 214. In this case, the pivot-point-side slide member 215 may be formed in a tubular shape fitted onto the swing support pin 214. Alternatively, a cutout portion can be formed at the swing support pin 214, and the pivot-point-side slide member 215 can be formed in a plate shape fitted in such a cutout portion and extending in a planar shape or an arc shape. In addition, the pivot-point-side slide member 215 can be also formed by resin material insert molding for the cutout portion formed at the swing support pin 214. Moreover, one of the swing support pin 214 itself or the pin slide hole 231 itself can be also made of a resin material. Note that the pivot-point-side slide member 215 is rotatably slidably formed at the outer peripheral portion of the swing support pin 214 so that the pivot-point-side slide member 215 can be easily assembled with the swing support pin 214 and slide resistance can be reduced.

Moreover, the pivot-point-side slide member 215 can be also provided at the pin slide hole 231 in addition to or instead of the swing support pin 214. Further, the centrifugal clutch 200 can be also configured such that the pivot-point-side slide member 215 is omitted and the swing support pin 214 and the pin slide hole 231 are directly fitted to each other upon sliding.

LIST OF REFERENCE SIGNS

100 Power transmission mechanism
101 Transmission
110 Drive pulley
111 Crankshaft
112 Stationary drive plate
112a Radiation fin
113 Movable drive plate
114 Sleeve bearing
115 Roller weight
116 Lamp plate
120 V-belt
130 Driven pulley
131 Stationary driven plate
132 Driven sleeve
133 Drive shaft
134 Movable driven plate
135 Torque spring
200 Centrifugal clutch
210 Drive plate
211 Bottom portion
211a Through-hole
212 Tube portion
213 Flange portion
214 Swing support pin
214a Attachment bolt
214b E-ring
215 Pivot-point-side slide member
216 Side plate
217 Cam body support pin
217a Attachment bolt
218 Plate-side cam body
220 Damper receiving pin
221 Damper
230 Clutch weight
231 Pin slide hole
232 Coupling spring
233 Clutch shoe
234 Plate-side cam body relief 235 Weight-side cam body
236 Damper groove
236a Rear wall
236b Front wall
240 Clutch outer
241 Cylindrical surface

The invention claimed is:

1. A centrifugal clutch comprising:
a drive plate to be rotatably driven together with a driven pulley in response to drive force of an engine;
a clutch outer having, outside the drive plate, a cylindrical surface provided concentrically with the drive plate;
a clutch weight having a clutch shoe formed to extend along a circumferential direction of the drive plate and facing the cylindrical surface of the clutch outer, one end side of the clutch weight in the circumferential direction being turnably attached onto the drive plate through a swing support pin and a pin slide hole and the other end side displacing toward a cylindrical surface side of the clutch outer;
a plate-side cam body having, on the drive plate, a surface extending in a rotary drive axis direction of the drive plate; and
a weight-side cam body provided at the clutch weight and configured to slide and climb on the plate-side cam body upon displacement of the other end side of the clutch weight;
a damper provided on the drive plate to face the clutch weight and including an elastic body; and
a damper groove formed in a groove shape at the clutch weight, extending along a turning displacement direction in which the clutch weight approaches or separates from the clutch outer, and configured such that the damper is fitted in the damper groove with the damper being slidably sandwiched by the damper groove,
wherein the swing support pin is provided at one of the drive plate or the clutch weight, and is formed to extend toward the other one of the drive plate or the clutch weight,
the pin slide hole is provided at the other one of the drive plate or the clutch weight and is formed in a long hole shape allowing backward displacement of the one end side of the clutch weight in a rotary drive direction of the drive plate, and the swing support pin is slidably displaceably fitted in the pin slide hole,
the damper groove is formed such that a groove width for fitting the damper when the clutch weight is at a clutch-ON position at which the clutch weight is pressed against the clutch outer expands to a front side in the rotary drive direction of the drive plate as compared to a groove width for fitting the damper when the clutch weight is at a clutch-OFF position at which the clutch weight is separated from the clutch outer, and
in the damper groove, a rear wall formed on a rear side in the rotary drive direction of the drive plate and a front wall formed on the front side in the rotary drive direction of the drive plate include curved surfaces having arcs about different positions, the rear wall and the front wall forming the damper groove.

2. The centrifugal clutch according to claim 1, wherein the damper groove is
formed such that the groove width for fitting the damper when the clutch weight is at the clutch-ON position is such the groove width that the damper is elastically deformed with an amount equal to or smaller than an elastic deformation amount of the damper when the clutch weight is at the clutch-OFF position.

3. The centrifugal clutch according to claim 2, wherein in the damper groove, a rear wall formed on a rear side in the rotary drive direction of the drive plate and a front wall formed on the front side in the rotary drive direction of the drive plate include curved surfaces having arcs about different positions, the rear wall and the front wall forming the damper groove.

4. The centrifugal clutch according to claim 3, wherein in the damper groove, a length of the front wall forming the damper groove and formed on the front side in the rotary drive direction of the drive plate is longer than a portion contacting the damper in a case where the clutch shoe contacts the clutch outer in a terminal state in which abrasion of the clutch shoe has progressed and the clutch shoe has approached a use limit.

5. The centrifugal clutch according to claim 4, wherein the damper groove is formed such that the rear wall forming the damper groove and formed on the rear side in the rotary drive direction of the drive plate is separated from the damper when the clutch weight displaces backward in the rotary drive direction of the drive plate.

6. The centrifugal clutch according to claim 3, wherein the damper groove is formed such that the rear wall forming the damper groove and formed on the rear side in the rotary drive direction of the drive plate is separated from the damper when the clutch weight displaces backward in the rotary drive direction of the drive plate.

7. The centrifugal clutch according to claim 2, wherein in the damper groove, a length of a front wall forming the damper groove and formed on the front side in the rotary drive direction of the drive plate is longer than a portion contacting the damper in a case where the clutch shoe contacts the clutch outer in a terminal state in which abrasion of the clutch shoe has progressed and the clutch shoe has approached a use limit.

8. The centrifugal clutch according to claim 7, wherein the damper groove is formed such that a rear wall forming the damper groove and formed on a rear side in the rotary drive direction of the drive plate is separated from the damper when the clutch weight displaces backward in the rotary drive direction of the drive plate.

9. The centrifugal clutch according to claim 2, wherein the damper groove is formed such that a rear wall forming the damper groove and formed on a rear side in the rotary drive direction of the drive plate is separated from the damper when the clutch weight displaces backward in the rotary drive direction of the drive plate.

10. The centrifugal clutch according to claim 1, wherein in the damper groove, a length of a front wall forming the damper groove and formed on the front side in the rotary drive direction of the drive plate is longer than a portion contacting the damper in a case where the clutch shoe contacts the clutch outer in a terminal state in which abrasion of the clutch shoe has progressed and the clutch shoe has approached a use limit.

11. The centrifugal clutch according to claim 10, wherein the damper groove is formed such that a rear wall forming the damper groove and formed on a rear side in the rotary drive direction of the drive plate is separated from the damper when the clutch weight displaces backward in the rotary drive direction of the drive plate.

12. The centrifugal clutch according to claim 1, wherein the damper groove is formed such that a rear wall forming the damper groove and formed on a rear side in the rotary drive direction of the drive plate is separated from the damper when the clutch weight displaces backward in the rotary drive direction of the drive plate.

* * * * *